Jan. 12, 1965
B. PERKINS, JR., ET AL
3,164,983
HORIZONTAL DISPLACEMENT METER
Filed Nov. 30, 1960
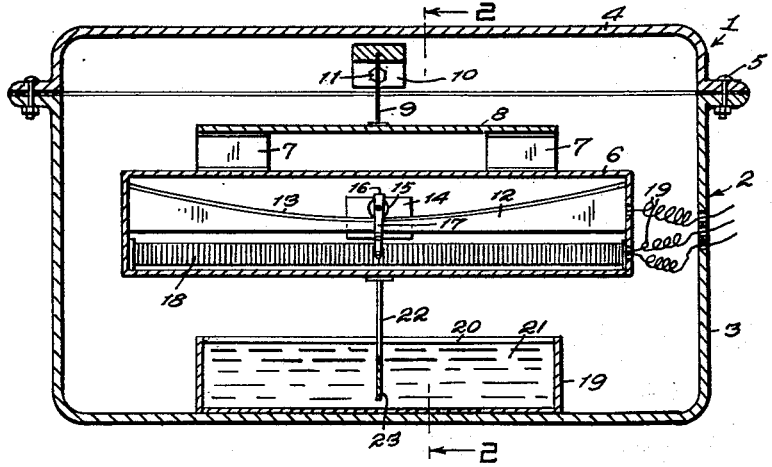
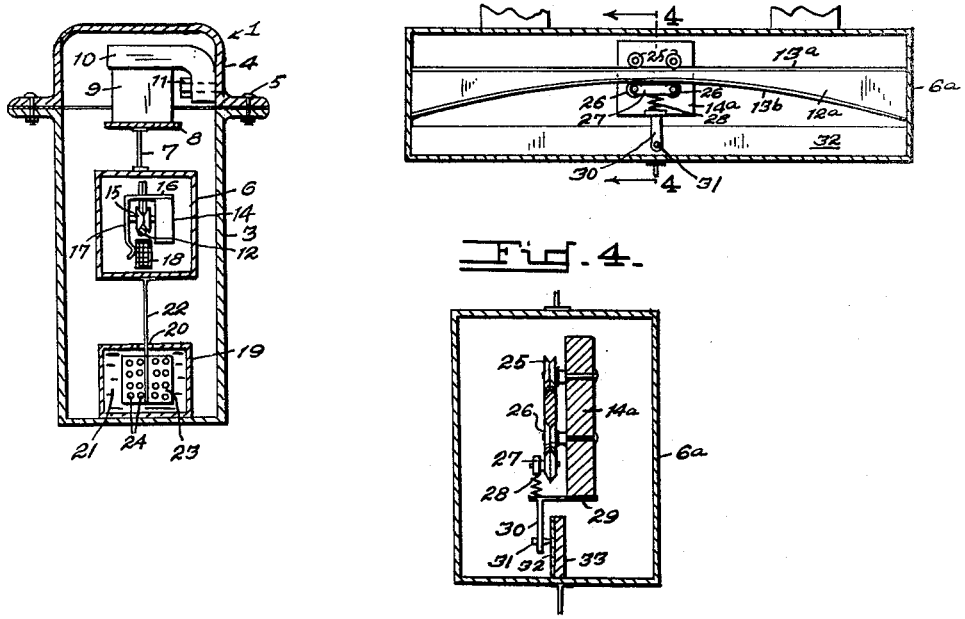
INVENTORS,
Beauregard Perkins, Jr.
Willis F. Jackson

# 3,164,983
HORIZONTAL DISPLACEMENT METER

Beauregard Perkins, Jr., and Willis F. Jackson, Aberdeen, Md., assignors to the United States of America as represented by the Secretary of the Army
Filed Nov. 30, 1960, Ser. No. 72,812
3 Claims. (Cl. 73—71)
(Granted under Title 35, U.S. Code (1952), sec. 266)

The invention described herein may be manufactured and used by or for the Government for governmental purposes without payment to us of any royalty thereon.

This invention relates to a horizontal displacement meter and more particularly to a device to determine the absolute transient motion of the ground particle from an explosion above or below the surface of the ground or by the impact of a large mass on the surface of the ground.

In the present invention, an inertial weight is suspended by rollers in a vertical plane on a track which is an arc of a circle. The track and weight are contained in an inner case which is suspended on a gimbal inside an outer case. The assembly is buried in the ground. When undisturbed, the weight will seek the lowest portion of the track, but upon movement of the ground due to an explosion above or below the ground, earthquake, etc., the inner case will move with the disturbance, but the weight inside the case will remain stationary due to its inertia. The relative motion between the weight and the inner case may be recorded by attaching a suitable transducer such as a linear differential transformer, or a slidewire potentiometer having a contact arm carried by the weight bearing against a resistance wire. The resistance wire and weight are connected to a suitable recording instrument by electrical leads, and the instrument may be placed at a point remote from the meter as is convenient.

The meter can be made a self contained unit without the use of wires, etc. by using an ink stylus attached to the contact arm of the weight and arranging it to mark on a chart within the inner case.

It is a primary object of this invention to provide a device to determine the absolute transient motion of the ground particle resulting from an explosion above the surface of the ground or by the impact of a large mass on the surface of the ground.

Another object is to provide a displacement meter in which an inertial weight is movable longitudinally along a track that is curved towards each end while the track is kept normally in a horizontal position.

A further object is to provide a horizontal displacement meter in which an inner case containing a displacement recording means is suspended by gimbals within an outer case, the inner case returning to a level position within the outer case after being displaced.

A still further object is to provide damping means between the outer and inner cases to permit the inner case to return slowly towards a level position within the outer case after being displaced and to prevent relative displacement of the inner case with respect to the outer case due to a sudden movement of the outer case.

Other objects and advantages of the invention will be apparent during the course of the following description.

Referring to the drawings:
FIG. 1 is a longitudinal section of the displacement meter of the invention in assembled form;
FIG. 2 is a cross section taken along line 2—2 of FIG. 1;
FIG. 3 is a longitudinal section through the inner casing of a modified embodiment; and
FIG. 4 is a cross section taken along line 4—4 of FIG. 3.

In the drawings, reference character 1 indicates the displacement meter in its entirety, comprising an outer case generally indicated by 2 and including a container 3 having a lid 4 secured thereto by bolts 5.

An inner case 6 is suspended by a pair of gimbals 7 to a bar 8 and the bar 8 is suspended by a single gimbal 9 to a bracket 10 secured to lid 4 by a bolt 11. Inner case 6 contains a track 12 disposed longitudinally therein and beveled at its upper edge as at 13 and curving outwardly towards the opposite ends thereof.

An inertia weight 14 is adapted to roll on track 12 by a roller 15 which is mounted on the weight 14 by a bracket 16. Bracket 16 has a downward depending spring contact arm 17.

A transducer 18 is longitudinally disposed below track 12 and the contact arm 17 will contact the winding of the transducer as it travels along track 12 in either direction.

Suitable electrical leads 19 may be arranged in any expeditious manner in order to connect the track 12 and transducer 18 to a recording instrument (not shown) that is remote from the displacement meter.

A damping means for the inner case is provided and consists of a container 19 fixed to the floor of outer case 3 midway below inner case 6, and having a longitudinal slot 20 in its top. Container 19 is filled with a viscous fluid 21. An arm 22 carried by the lower end of inner case 6 is provided with a vane 23 having perforations 24. The vane 23 dips in fluid 21 as seen in FIGS. 1 and 2. However, other forms of damping means could readily be substituted, if desired, such as magnetic means, etc.

In FIGS. 3 and 4 there is shown a modified embodiment of the invention. In this form, track 12a is beveled on both top edge 13a and bottom edge 13b. Weight 14a is mounted to roll on track 12a by rollers 25 on the top edge 13a attached to weight 14a and by rollers 26 on the bottom edge 13b of track 12a. Rollers 25 are carried by weight 14a while rollers 26 are independent of track 12a and are carried by a link 27 and are biased towards lower edge 13b by a spring 28 mounted on a bracket 29 attached to the under side of weight 14a.

A different means for indicating displacement is also shown in FIGS. 3 and 4 which eliminates the use of a transducer and further enables the meter to be self contained unit. A downwardly depending arm 30 carries a stylus 31 which may be a pencil, indelible ink point, etc., which contacts a chart 32 pasted or otherwise fixed on a standard 33 which in turn is fixed to the floor of inner casing 6a. No damping means is shown in FIGS. 3 and 4 but such may be employed if desired. However, the transducer 18 of FIGS. 1 and 2 could be used instead of a chart, if desired.

The operation of both forms are similar. The meter when assembled, is buried in the ground, inner case 6 being suspended by gimbals 7 and 9 will be self-leveling. The meter may be electrically connected to a recording instrument (not shown) which can be remotely placed from the meter by suitable electric leads 19.

Upon an explosion above or below the ground, or on impact on the surface of the ground, or earthquake or like disturbance, the meter will be moved by the ground, both outer and inner cases thereof. The weight 14 will remain stationary due to its inertia. Contact arm 17 will move along transducer 18 and send electrical signals to the recording instrument (not shown).

The weight 14 being suspended vertically will seek the lowest point on the track, which is the middle due to the curvature of the track.

The inner case will be returned to level position by the gimbals 7 and 9.

In the embodiment shown in FIGS. 3 and 4 the top edge 13a of track is flat and the bottom edge 13b curves at each side. Rollers 25 ride on the surface 13a while rollers 26 are biased against track 12a by a spring 28 which serves to cause the weight 14a to return to the middle of the track. Stylus 31 transcribes the earth movement on the chart 32.

In both forms, the mass of the inertial weight is small compared to that of the inner case.

The unit is highly compact and mobile and can be utilized in engineering fields for such purposes as indicating the transient movement of a building or of the ground, caused by an earthquake or by an explosion.

The inner case, though being damped so that it may be left unattended, will still be able to respond to a transient horizontal motion. If the period of the transient is one third of the period of the motion of the weight on the track or less, the displacement of the weight will equal the displacement of the ground particle.

Variations and modifications may be effected without departing from the scope of the novel concept of the present invention as set further in the claims.

What is claimed is:

1. A horizontal displacement meter for placement below the ground surface and responsive to transient motion of the ground particle from an explosion above or below the surface of the ground, including in combination, an outer case, an inner case flexibly suspended for self-leveling therein, a track having a doubly beveled upper edge and defining an upwardly curving arc of a circle and being fixed longitudinally within said inner case, an inertial weight mounted for free movement along said track, recording means within said inner case, comprising a recording element fixed longitudinally within said inner case and being disposed in longitudinal alignment and spaced below said track and a downwardly depending contact arm fixed to said inertial weight and adapted to slidably contact said recording element, whereby when said inner case is displaced, said arm will slide along said recording element to record motion of said meter, and damping means carried by said inner and outer cases for preventing sudden displacement of said inner case.

2. A horizontal displacement meter as set forth in claim 1 wherein said track has a flat upper edge and a downwardly curving lower edge, said lower edge defining an arc of a circle, a first pair of rollers carried by said weight and adapted to roll on the upper side of said track, and a second pair of spring biased rollers carried by said weight, said second pair of rollers adapted to roll on the lower edge of said track and to urge said weight towards a medial point on said track.

3. In a device as claimed in claim 1 wherein the mass of said inertial weight is less than that of said inner case.

References Cited by the Examiner
UNITED STATES PATENTS

| | | | |
|---|---|---|---|
| 619,734 | 2/99 | Duncan | 73—430 |
| 786,696 | 11/04 | Vreeland | 73—430 |
| 851,976 | 4/07 | Benecke | 73—430 |
| 2,157,514 | 5/39 | Whipple | 73—492 |
| 2,207,204 | 7/40 | Peyton et al. | 73—71 |
| 2,244,417 | 6/41 | Bacon | 73—514 |
| 2,286,897 | 6/42 | Costa et al. | 73—71.2 |
| 2,332,994 | 10/43 | Draper et al. | 73—71.2 |
| 2,618,156 | 11/52 | Boucher | 73—382 |
| 2,674,885 | 4/54 | Silverman | 73—382 |
| 2,838,358 | 6/58 | Wattles | 73—492 |
| 2,930,138 | 3/60 | La Coste | 73—382 |
| 2,979,959 | 4/61 | Clurman | 73—71.2 |
| 3,017,083 | 1/62 | Greenwood | 73—71 |

RICHARD C. QUEISSER, *Primary Examiner.*

ROBERT L. EVANS, *Examiner.*